M. C. A. LATOUR.
ALTERNATING CURRENT MOTOR.
APPLICATION FILED OCT. 28, 1914.

1,192,649.

Patented July 25, 1916.
2 SHEETS—SHEET 1.

Witnesses:

Inventor:
Marius C. A. Latour,
by
His Attorney.

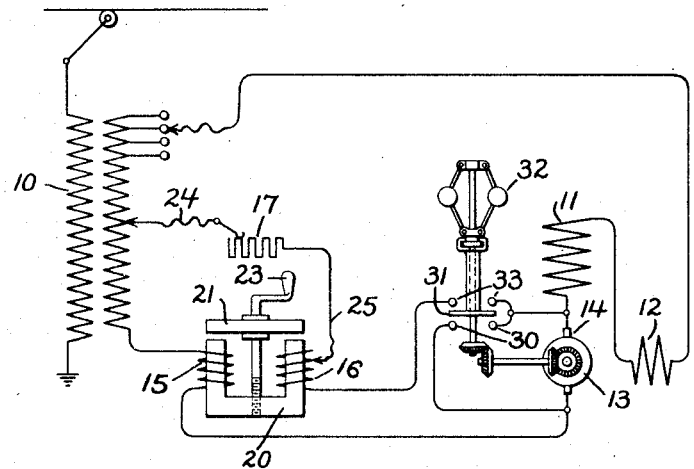
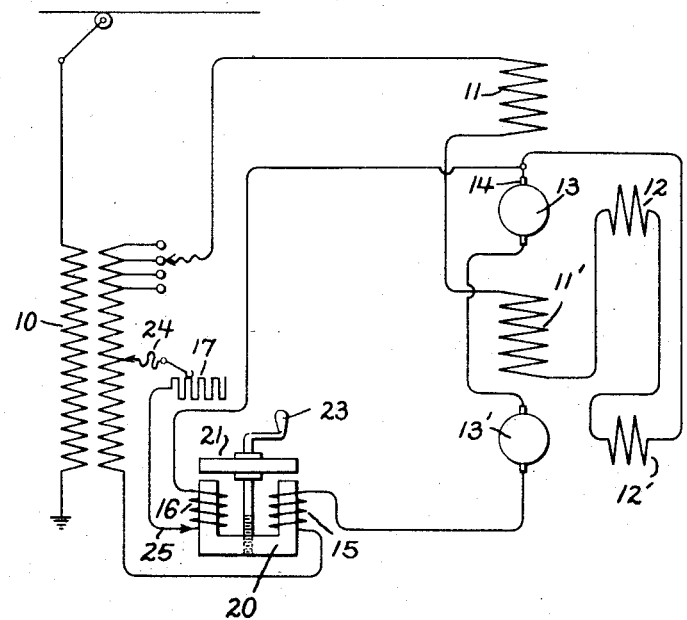

UNITED STATES PATENT OFFICE.

MARIUS C. A. LATOUR, OF PARIS, FRANCE, ASSIGNOR TO GENERAL ELECTRIC COMPANY, A CORPORATION OF NEW YORK.

ALTERNATING-CURRENT MOTOR.

1,192,649.  Specification of Letters Patent.  Patented July 25, 1916.

Application filed October 28, 1914. Serial No. 869,101.

*To all whom it may concern:*

Be it known that I, MARIUS C. A. LATOUR, a citizen of the Republic of France, residing at Paris, France, have invented certain new and useful improvements in Alternating-Current Motors, of which the following is a specification.

My invention relates to alternating current motors, and more particularly to alternating current compensated series motors.

The object of my invention is generally to improve the commutation of an alternating current compensated series motor, and particularly to provide a novel and improved arrangement for a motor of this type whereby it is enabled to operate substantially sparklessly.

I have heretofore suggested, as hereinafter mentioned, as a means for improving the commutation of a compensated series motor for alternating current, a closed circuit connection about the motor-armature including an auxiliary electromotive force of the proper phase for producing a current for producing a commutating field, and I have further suggested a means for obtaining this auxiliary electromotive force from the electromotive force of the main source of energy supply modified by an electromotive force derived from a transformer connected in series with the motor.

More specifically, the object of my present invention is then to provide an improved and satisfactory means for obtaining an electromotive force of the proper phase for connection in a local circuit about the motor-armature for producing a current for producing a commutating field, and particularly such an electromotive force having one component dependent in phase upon the voltage impressed on the motor and a second component dependent in phase upon the motor current.

The novel features of my present invention which I believe to be patentable are definitely indicated in the claim appended hereto.

Figure 1:
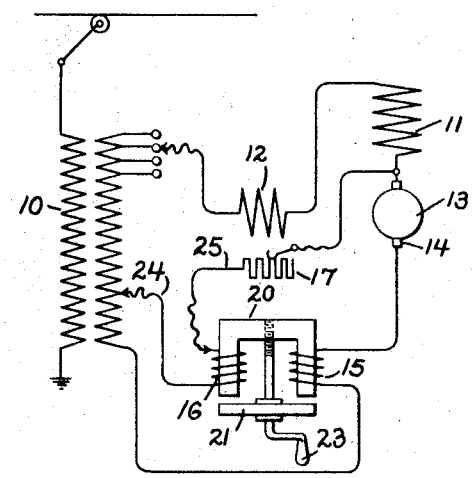
Figure 2:
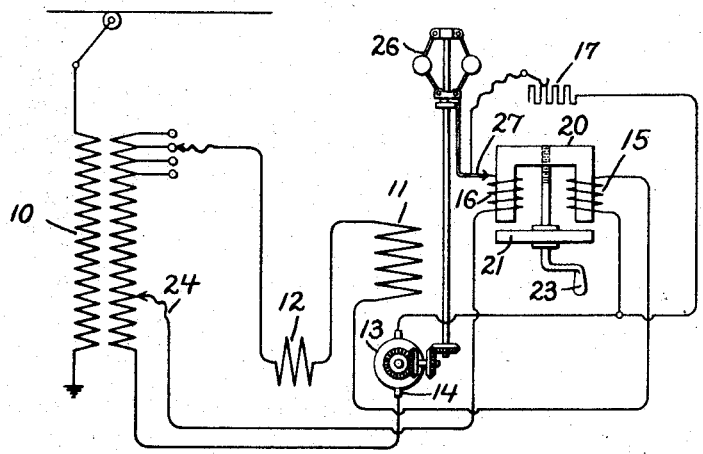

The nature of my invention and its application to alternating current compensated series motors will be understood from the following description taken in connection with the accompanying drawings, in which:

Figure 1 is a diagrammatic view of my invention applied to a single phase alternating current compensated series motor; Fig. 2 is a modified form of the application of my invention to such a motor; Fig. 3 is a still further modification of the invention; and Fig. 4 is a diagrammatic view of my invention applied to a plurality of compensated series motors connected in series with each other.

In French Patent No. 355,687, granted to me September 8th, 1905, and in United States Patent No. 841,257, granted to me June 15th, 1907, I have disclosed in combination with a compensated series motor for alternating current means for connecting the motor-armature in a closed circuit with a source of electromotive force of proper phase for producing a current for producing a commutating field. As described in these patents, the source of electromotive force employed has one component dependent in phase upon the voltage impressed on the motor and a second component dependent in phase on the motor current. As illustrated in Fig. 5 of the French patent and in Fig. 3 of the United States patent, an electromotive force of the proper phase for connection across the motor-armature to produce the necessary commutating field may be obtained by an electromotive force derived from the main source of energy supply modified by an electromotive force derived from the secondary winding of a transformer connected in series with the motor. The electromotive force component derived from the main source of supply is in phase with the voltage impressed on the motor, while the electromotive force component derived from the secondary winding of the series transformer is substantially ninety degrees out of phase with the current in the primary winding and varies with variations in the magnitude of the primary current. The primary and secondary windings of the series transformer are thus traversed by currents in quadrature with respect to time phase. It follows therefrom that the resultant of the primary and secondary ampere turns of the series transformer may be relatively large, that is to say, even of the order of magnitude of the primary or secondary ampere turns. Inasmuch as it is the resultant of the primary and secondary ampere turns which must be taken into account in the design of the magnetic circuit of the transformer, it will be evident that, unless certain precautionary provisions are taken, only a very small number of turns should be arranged on the transformer. The normal number of turns for the primary and secondary windings of the transformer would produce excessive saturation of the transformer, which would upset normal working conditions. That is to say, the normal number of primary and secondary ampere turns would cause the magnetic circuit of a transformer of ordinary size to become saturated, and in order to prevent saturation, the magnetic material of the transformer would have to be very voluminous, and hence the cost of the transformer would be excessive. On the other hand, if the transformer is provided with a small number of primary and secondary turns there is a very bad utilization of the magnetic circuit.

In accordance with my present invention, the series transformer is provided with an air gap in its magnetic circuit, under which condition the resultant of the primary and secondary ampere turns, even if the primary and secondary windings of the transformer have the normal number of turns, will not give rise to any disturbing phenomena in the saturation. This application of my invention results in providing a transformer reduced both in volume or size, or in cost.

My invention will be better understood by reference to the accompanying drawings, which diagrammatically illustrate the invention applied in various ways to compensated series motors for alternating current.

In each of the figures of the accompanying drawings, I have represented a single phase compensated series motor connected to the secondary winding of a main transformer 10. The compensated series motor is particularly adapted for railway work, and I have, accordingly, represented the primary of the transformer 10 connected between a trolley wire and ground. The compensated series motor comprises a compensating winding 11, an exciting or field winding 12, and an armature 13 carrying a commutated armature winding. Brushes 14 bear on the commutator connected to the armature winding in the usual manner, and the compensating, field and armature windings are connected in series, as is well understood. The field winding 12 produces an exciting field at right angles to that produced by the armature current, and the compensating winding 11 produces a field in line with the axis of the armature reaction, so as to neutralize the armature reaction in the manner well understood in the art.

In accordance with my prior patents the primary winding 15 of a transformer is connected in series with the motor, and the secondary winding 16 of this transformer is connected in a local circuit including the motor-armature and a section of the secondary winding of the main transformer 10. This local circuit also contains an adjustable resistance 17. A commutating field electromotive force, having one component in phase with the voltage impressed on the motor and a second component dependent in phase upon the current flowing through the motor, is thus impressed on the commutator brushes. By varying the two components of the electromotive force in the closed circuit about the motor-armature, the motor may be adjusted for substantially sparkless commutation over widely varying speeds.

In accordance with my present invention, the magnetic circuit of the series transformer has an air-gap, preferably adjustable, so that better conditions of commutation may be obtained at different speeds. In the figures of the accompanying drawings, I have, for the purpose of illustration, represented the magnetic circuit of the transformer composed of two independent members, the first a main U-shaped member 20, upon which the primary and secondary windings are mounted, and the second a movable magnetic armature or keeper 21 adapted to complete the magnetic circuit from one leg of the U-shaped member to the other. The air-gap between the U-shaped member 20 and the keeper 21 may be adjusted by turning a screw-handle 23, as will be readily understood from an inspection of the drawings. It will be evident from the foregoing explanation that the provision of an air-gap in the magnetic circuit of the series transformer permits the use of a normal number of primary and secondary turns without necessitating an excessive amount of magnetic material in the magnetic circuit of the transformer, in order to prevent saturation, due to the large magnitude of the resultant of the primary and secondary ampere turns.

In each of the examples of my invention illustrated in the figures of the accompanying drawings, the value of both components of the electromotive force included in the closed circuit about the motor-armature may be adjusted to secure the proper phase and magnitude of the resultant electromotive force to produce a commutating field of the proper phase and amount for enabling the motor to operate sparklessly at any given speed within limits. Thus the component of this electromotive force in phase with the voltage impressed on the motor may be adjusted by means of the adjustable connection of the conductor 24 to the secondary winding of the main transformer 10, and the component dependent in phase upon the motor current may be adjusted by means of the adjustable connection of the conductor 25 to the secondary winding 16 of the series transformer.

The variable ratio of transformation of the series transformer serves to insure perfect commutation at varying speeds of the motor. The transformation-ratio may be governed or varied in accordance with the electromotive force placed in opposition on the armature of the motor by the main feed transformer. This variation of the transformation-ratio may be accomplished automatically as a function of the speed of the motor, for example by means of a centrifugal speed governor. This modification of my invention is illustrated in Fig. 2 of the drawings. A speed responsive device, such as a centrifugal speed governor 26, operatively connected to the rotatable shaft of the motor, automatically manipulates an adjustable contact 27 to vary the number of turns of the secondary winding of the series transformer included in the closed circuit about the motor-armature as a function of the speed of the motor. It will also be noted that in Fig. 2 of the drawings the primary winding 15 of the series transformer is connected between the compensating winding 11 of the stator of the motor and the armature 13, instead of between the armature and the main transformer, as in Fig. 1 of the drawings. The insulation between the primary and secondary windings of the series transformer may be heavy when the primary winding is connected as illustrated in Fig. 2.

In Fig. 3 of the drawings I have illustrated a further modification of my invention, in that a connection is employed for operating the motor as a repulsion motor. When the motor is starting, the switch contacts 30 are bridged by a movable metallic bar 31 and a local short-circuit is provided about the motor armature. The motor thus starts as a repulsion motor. When a predetermined speed is attained, a speed responsive device, such as the centrifugal governor 32 operatively connected to the rotor of the motor and to the bar 31, lifts the bar 31, and the contacts 33 are thereby bridged. The contacts 33 remain closed by the bar 31 as long as the speed of the motor remains above such predetermined speed, and in this condition the motor connections are the same as represented in the motor of Fig. 1 of the drawings. The motor illustrated in Fig. 3 of the drawings thus starts as a repulsion motor without the application of the invention of my prior patents, but runs normally, that is when the speed exceeds a predetermined value, with a connection utilizing such invention.

Where a plurality of motors are in use, a single series transformer may be employed for all. Assuming the case of two motors and referring to Fig. 4 of the drawings, it will be seen that two compensated series motors are connected in series with each other and that my invention is applied to these motors through a single transformer connected in series relation with the two motors. Starting with the adjustable connection to the secondary winding of the main transformer 10, the electric circuit is through the two compensating windings 11 and 11' arranged in series relation to one another, thence through the two field windings 12 and 12' similarly related in series, then through the armature windings of the two armatures 13 and 13', and finally through the primary winding 15 of the series transformer to the other terminal of the main transformer. The two armatures 13 and 13' connected in series are closed through a single local circuit including the secondary winding 16 of the series transformer, the adjustable resistance 17, and an adjustable portion of the secondary winding of the main transformer 10. It will be seen that the corresponding parts of the two motors are separately connected in series, the order of the series-connected compensating windings, on the one hand, and the series connected field windings, on the other hand, being, however, immaterial.

While I have herein specifically shown and described the series transformer as having two separate windings, it will be obvious to those skilled in the art that a single winding may serve the function of both; in other words, that a compensator connected in series relation with the motor may be employed, if desired, in place of the series transformer.

It will, of course, be understood that my invention is not limited to the specific modifications herein illustrated. Thus, while I have explained my invention by illustrating and describing certain embodiments thereof, it will be understood that the invention may be embodied in other forms than that shown and described. I, accordingly, do not wish to be restricted to the particular forms and constructions diagrammatically represented herein by way of example for the purpose of setting forth my invention in accordance with the patent statutes. The terms of the appended claim are, therefore, not restricted to the precise structures disclosed, but are intended to cover all changes and modifications within the spirit and scope of my invention.

What I claim as new and desire to secure by Letters Patent of the United States, is:—

The combination with an alternating current motor having a compensating winding an exciting winding and an armature winding conductively connected in series, and a transformer having its primary winding included in the series circuit of said three motor windings and having an air gap in its magnetic circuit, of a local circuit including said armature winding and the secondary winding of said transformer and an auxiliary electromotive force dependent in phase upon the voltage impressed on the motor.

I have hereunto set my hand this 12th day of October, 1914.

MARIUS C. A. LATOUR.

Copies of this patent may be obtained for five cents each, by addressing the "Commissioner of Patents, Washington, D. C."